(12) United States Patent
Sharma et al.

(10) Patent No.: US 7,336,436 B2
(45) Date of Patent: *Feb. 26, 2008

(54) HEAD GIMBAL ASSEMBLIES FOR VERY LOW FLYING HEIGHT HEADS WITH OPTIONAL MICRO-ACTUATORS IN A HARD DISK DRIVE

(75) Inventors: Vinod Sharma, Los Gatos, CA (US); Haesung Kwon, San Jose, CA (US); Hyung Jai Lee, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/903,730

(22) Filed: Jul. 29, 2004

(65) Prior Publication Data

US 2006/0023338 A1    Feb. 2, 2006

(51) Int. Cl.
  *G11B 5/60* (2006.01)
  *G11B 21/21* (2006.01)
(52) U.S. Cl. ........................................... 360/75
(58) Field of Classification Search ............. None
  See application file for complete search history.

(56) References Cited

U.S. PATENT DOCUMENTS 5,276,573 A * 1/1994 Harada et al. ............ 360/235.3
2005/0105218 A1 * 5/2005 Sharma et al. ........... 360/245.9
2005/0152072 A1 * 7/2005 Kwon et al. ............. 360/294.4

* cited by examiner

*Primary Examiner*—Hoa T. Nguyen
*Assistant Examiner*—James L Habermehl
(74) *Attorney, Agent, or Firm*—GSS Law Group; Earle Jennings (57) ABSTRACT

Head gimbal assembly (HGA) may include a piezo layer mechanically coupled with the slider or include a piezo element mechanically coupled by the flexure to the slider top near the read-write head. A bridge flex circuit is included, providing a piezo-control bundle to at least one piezo layer lead. A flex circuit assembly may further provide a piezo control bundle, shared with piezo control bundles for multiple read-write heads. HGA may include a micro-actuator to position read-write head near track on accessed, rotating disk surface. Flex circuit assembly may provide a source control bundle, shared with the micro-actuator control bundles for multiple read-write heads. When accessing, all micro-actuators perform same positioning action, insuring proper positioning of read-write head. This applies to both co-located and non co-located micro-actuators. Wire bundles may include one or two active signal wires. Voice coil actuators and hard disk drives, and their manufacture, are included.

16 Claims, 8 Drawing Sheets

HEAD GIMBAL ASSEMBLIES FOR VERY LOW FLYING HEIGHT HEADS WITH OPTIONAL MICRO-ACTUATORS IN A HARD DISK DRIVE

CROSS-REFERENCE TO RELATED APPLICATIONS:

This application is a continuation-in-part of U.S. patent application Ser. No. 10/713,616, filed Nov. 13, 2003.

BACKGROUND OF THE INVENTION

1. Field of the Invention

The present invention relates to head gimbal assemblies in a hard disk drive.

2. Background Information

Modern disk drives include a servo controller driving a voice coil actuator to position a read-write head near a track on a rotating disk surface. The read-write head communicates with the servo controller, providing feedback, which is used in controlling the read-write head's positioning near the track. The read-write head is embedded in a slider, which floats on a thin air bearing a very short distance above the rotating disk surface.

The trend in the hard disk drive industry is to increase the areal density of the rotating disk surfaces. This is usually achieved by decreasing the flying height of the read-write head above the rotating disk surface. Currently, read-write heads fly at 10 nano-meters (nm) from the rotating disk surfaces.

There are problems with flying the read-write heads and sliders so near the rotating disk surfaces. Contact between the read-write heads and the disk surface they access, needs to be minimized, to insure the reliability of the hard disk system as a whole. For example, the read-write heads may contact the disk surface, which tends to reduce the reliability of the data stored there, and may possibly damage the read-write head as well.

A voice coil actuator typically includes a voice coil, which swings at least one actuator arm in response to the servo controller. Each actuator arm includes at least one head gimbal assembly typically containing a read-write head embedded in a slider. The head gimbal assembly couples through a load beam to the actuator arm in the voice coil actuator.

A hard disk drive may have one or more disks. Each of the disks may have up to two disk surfaces in use. Each disk surface in use has an associated slider, with the necessary actuator arm. Hard disk drives typically have only one voice coil actuator.

Today, the bandwidth of the servo controller feedback loop, or servo bandwidth, is typically in the range of 1.1 K Hz.

Extending servo bandwidth increases the sensitivity of the servo controller to drive the voice coil actuator to finer track positioning. Additionally, it decreases the time for the voice coil actuator to change track positions.

However, extending servo bandwidth is difficult, and has not significantly improved in years. As areal densities increase, the need to improve track positioning increases.

One answer to this need involves integrating a micro-actuator into each head gimbal assembly. These micro-actuators are devices typically built of piezoelectric composite materials, often involving lead, zirconium, and tungsten. The piezoelectric effect generates a mechanical action through the application of electric power. The piezoelectric effect of the micro-actuator, acting through a lever between the slider and the actuator arm, moves the read-write head over the tracks of a rotating disk surface.

The micro-actuator is typically controlled by the servo-controller through one or two wires. Electrically stimulating the micro-actuator through the wires triggers mechanical motion due to the piezoelectric effect. The micro-actuator adds fine positioning capabilities to the voice coil actuator, which effectively extends the servo bandwidth. The single wire approach to controlling one micro-actuator provides a DC (direct current) voltage to one of the two leads of the piezoelectric element. The other lead is tied to a shared ground. The two wire approach drives both leads of the piezoelectric element of the micro-actuator.

There are two approaches to integrating the micro-actuator into a head gimbal assembly. Embedding the micro-actuator between the slider and the load beam, creates a co-located micro-actuator. Embedding the micro-actuator into the load beam, creates a non co-located micro-actuator. The non co-located micro-actuators tend to consume more power, requiring higher driving voltages than the co-located micro-actuators.

A problem arises when integrating micro-actuators into hard disk drives with multiple disk surfaces. Each of the micro-actuators requires its leads to be controlled by the servo-controller. These leads are coupled to wires, which must traverse the main flex circuit to get to the bridge flex circuit. The bridge flex circuit provides electrical coupling to the leads of the micro-actuator.

The main flex circuit constrains many components of the voice coil actuator. If the shape or area of the main flex circuit is enlarged, changes are required to many of the components of the actuator arm assembly and possibly the entire voice coil actuator. Changing many or most of the components of an actuator arm assembly, leads to increases in development expenses, retesting and recalibrating the production processes for reliability, and inherently increases the cost of production.

The existing shape and surface area of the main flex circuit has been extensively optimized for pre-existing requirements. There is no room in the main flex circuit to run separate control wires to each micro-actuator for multiple disk surfaces. This has limited the use of micro-actuators to hard disk drives with only one active disk surface.

What is needed is a way to minimize the time that the read-write heads fly close to the rotating disk surfaces they access. What is further needed, is a way to integrate micro-actuators into multiple disk surface disk drives using the existing surface area and shape of the main flex circuit.

BRIEF SUMMARY OF THE INVENTION

The present invention includes a head gimbal assembly, which may include a piezo layer mechanically coupled with the slider. The bending of the piezo layer alters the flying height of the read-write head of the slider over the rotating disk surface. The head gimbal assembly further includes a bridge flex circuit coupling with the piezo layer to provide a piezo-control bundle to at least one of the leads of the piezo layer.

Piezo layers include two leads. When a voltage difference is applied across the leads, the piezoelectric effect causes the piezo layer to bend, which alters the shape of the slider, and the flying height of the read-write head. In certain embodiments, one of these leads may be grounded and the other lead couples with a single wire of the piezo-control bundle.

In other embodiments, the piezo-control bundle includes two wires, which couple to the two leads.

Alternatively, the head gimbal assembly may include a piezo element mechanically coupled by a flexure to a slider top near a read-write head. When the piezo element is electrically excited, it bends the flexure to alter the flying height of said read-write head over the accessed, rotating disk surface. The flying height may be altered by any combination of the following. The piezo element bending the flexure may alter the slider camber. The piezo element bending the flexure may alter the pitch of the slider over the rotating disk surface.

The invention provides a way to control the flying height of the read-write head minimizing the time in which it is closest to the rotating disk surface. By minimizing this time, contacts between the read-write head and the disk surface are minimized, increasing the reliability of the data stored on the surface, and increasing the read-write head reliability. By increasing the data storage and read-write head reliability, the hard disk drive reliability improves.

The invention includes a flex circuit assembly providing a piezo control bundle, which is shared with the piezo control bundles for multiple read-write heads. This flex circuit assembly adds the advantage of minimizing the consequences of controlling the piezo layers and/or piezo elements in multiple read-write heads. These consequences come from increasing the shape or surface area of the main flex circuit. In these embodiments, the flying heights of all the read-write heads are controlled identically. The advantage of minimizing the flying heights is balanced with the advantage of minimal impact to the overall voice coil actuator assembly, which is strongly affected by the shape and surface area of the main flex circuit.

The head gimbal assembly may further include a micro-actuator to position the read-write head near a track on the accessed, rotating disk surface. These embodiments add the advantages of increased positioning capability, while providing flying height control.

The flex circuit assembly may further provide a source control bundle, which is shared with the micro-actuator control bundles for the multiple read-write heads. When accessing a disk surface, all the micro-actuators perform the same positioning action, insuring the proper positioning of the read-write head in the slider above the accessed disk surface. The invention applies equally to co-located and non co-located micro-actuators. The wire bundle may include one active signal wire or two active signal wires.

These embodiments offer the advantages of both flying height control and micro-actuator positioning for multiple surfaces in hard disk drives, without disrupting the overall design of the voice coil actuator. The micro-actuators increase the servo bandwidth from about 1.1 K Hz to over 2.6 K Hz.

The invention includes the head gimbal assemblies and the flex circuitry. The invention further includes voice coil actuators built with the flex circuitry and the head gimbal assemblies, and the hard disk drives built with the voice coil actuators, as well as the methods of making these components.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventors for carrying out the invention. Various modifications, however, will remain readily apparent to those skilled in the art, since the generic principles of the present invention have been defined herein.

Figure 1A:
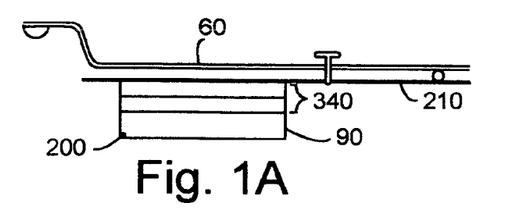
FIG. 1A shows a side view of a head gimbal assembly including the piezo layer at reset.
Figure 1B:
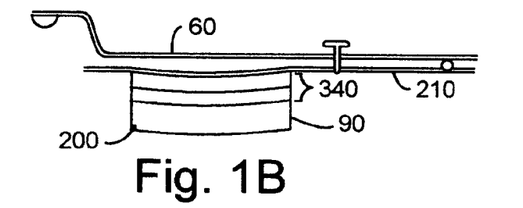
FIG. 1B shows the head gimbal assembly of FIG. 1A actively bending down to alter the flying height of the slider and the read-write head embedded in the slider.
Figure 1C:
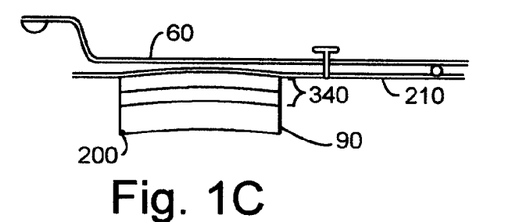
FIG. 1C shows the head gimbal assembly of FIG. 1A actively bending up to alter the flying height of the slider and the read-write head embedded in the slider.

The invention may include head gimbal assemblies 60 as shown in FIGS. 1A-1C including a piezo layer 340 mechanically coupled to a slider 90. The read-write head 200 is embedded into a surface of the slider 90.

Figure 1D:
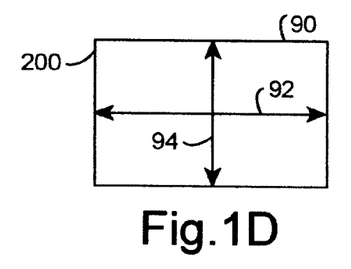
FIG. 1D shows a cross sectional view of the slider of FIGS. 1A-1C defining the camber and crown as well as showing a second example location of the read-write head.

FIG. 1D shows a cross section of the slider 90 of FIGS. 1A-1C, with an alternative position of the read-write head 200. The crown of the slider refers to the curvature about the major axis 92 of the slider. The camber of the slider refers to the curvature about the minor axis 94 of the slider.

FIG. 1A shows the head gimbal assembly 60 with the piezo layer 340 in a neutral state, providing no significant effect on the slider crown. FIG. 1B shows the head gimbal assembly 60 affected by the excitation of the piezo layer 340. FIG. 1B shows the piezo layer 340 bending, which causes positive curvature in the crown of the slider 90, referred to as positive slider crown. FIG. 1C shows the head gimbal assembly 60 affected by the excitation of the piezo layer 340, which bends, causing negative curvature in the crown of the slider 90, referred to as negative slider crown.

The piezo layer 340 may alter the camber 94, and/or the crown 92, of the slider 90 of FIG. 1D. Preferably, the piezo layer 340 alters the camber 94 or the crown 92, whichever most affects the flying height of the slider 90 above the rotating disk surface. The discussion will focus on the embodiments, which preferably alter the camber of the slider.

The invention as shown in FIGS. 1A-1C operates as follows: The piezo layer 340 is excited by its two leads experiencing a voltage difference. When the piezo layer 340 is excited, it bends constrained by the bonding to the slider 90, either inwardly as in FIG. 1B or outwardly as in FIG. 1C. This bending changes the camber 94 of the slider 90. A positive camber 94 usually results from the positive expansion of the piezo layer 340 shown in FIG. 1B. A negative camber 94 usually results from the negative expansion of the piezo layer 340 shown in FIG. 1C. These pizeo layer expansions alter the flying height of the slider 90 and the read-write head 200.

By way of example, numerical simulations using a stress strain finite element simulation found the following. Assume the piezo layer 340 of FIGS. 1A-1D has a length of 1.2 mm, a height of 0.2 mm, and a piezo constant of $3e\text{-}10$ m/Volt. A free state calculation of a 40 Volt excitation leads to a crown change of 22.6 nm at the center of the slider 90. Depending upon the air bearing surface design for the slider 90, the crown change may lead to a 3.81 nm change in the flying height of the slider 90. If the piezo layer 340 is composed of a multi-layer piezoelectric device, rather than a bulk piezoelectric device, then a lower voltage may have the same effect.

Figure 1E:
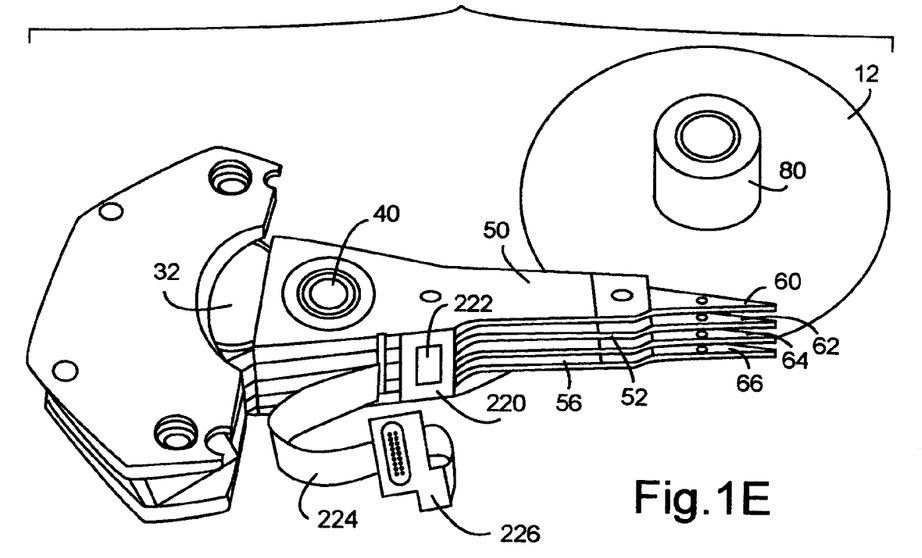
FIG. 1E shows a voice coil actuator including the slider of FIGS. 1A to 1D and the flex circuitry of the invention.
Figure 1F:
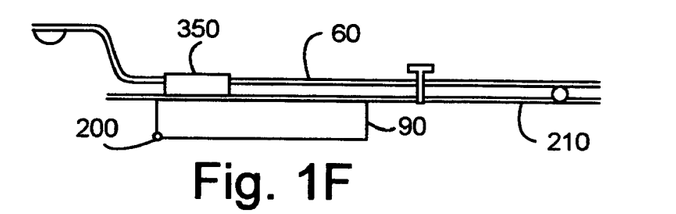
FIG. 1F shows a side view of an alternative head gimbal assembly including a piezo element coupled by a flexure to a slider top near a read-write head.
Figure 1G:
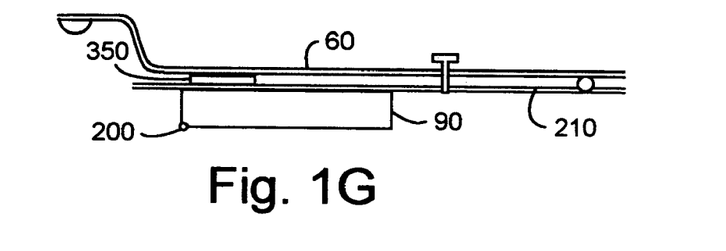
FIG. 1G shows a side view of another alternative head gimbal assembly including a piezo element coupled by a flexure to a slider top near a read-write head.

Alternatively, the invention may include head gimbal assemblies 60 as shown in FIGS. 1F-1J. These include a piezo element 350 attached to the flexure 210 on top of the slider 90, near the read-write head 200. FIG. 1F shows the piezo element 350 protruding through the load beam of the head gimbal assembly 60. FIG. 1G shows the piezo element 350 thin enough that the load beam does not contact the piezo element 350, which is preferred.

Figure 1H:
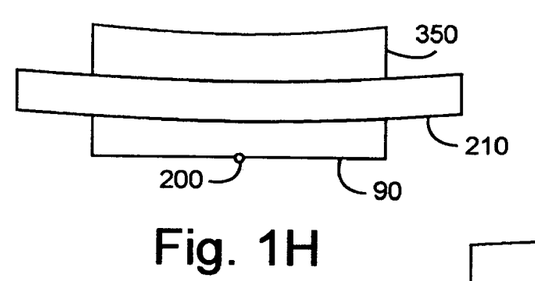
FIGS. 1H and 1I show front views of the excited piezo element bending the flexure of FIGS. 1F and 1G.
Figure 1I:
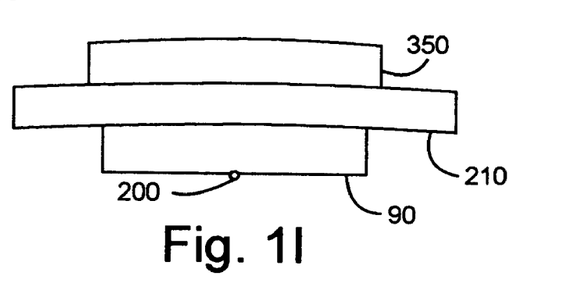
Figure 1J:
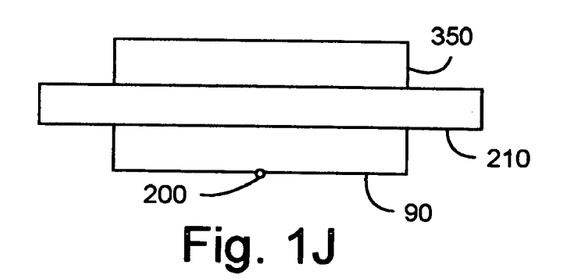
FIG. 1J shows a front view of the piezo element of FIGS. 1F-1I, when the piezo element is not excited.

FIGS. 1H-1J shows front views of the piezo element 350, of FIGS. 1F and 1G, attached to the flexure 210 on top of the slider 90, near the read-write head 200. When the leads of the piezo element 350 do not experience a significant voltage difference, the piezo element 350 is in an unexcited state, as in FIG. 1J. When a voltage across its leads excites the piezo element 350, the pitch of the slider 90 changes. The slider pitch, as used herein, is the angle between the bottom face of the slider 90 and the rotating disk surface 12 of FIG. 1E. The bottom face is the face of the slider 90 including the read-write head 200, which accesses the rotating disk surface 12. The excitation of the piezo element 350 acts upon the flexure 210 to change the camber 94 of the slider 90, which induces a change in the flying height. The net change in the flying height of the read-write head 200 is due to a combination of the changes in the slider pitch and in the slider camber.

By way of example, numerical simulations using a stress strain, finite element simulation found the following. Assume the piezo layer 350 of FIGS. 1F-1J has a length of 1.2 mm, a height of 0.2 mm, a width of 0.2 mm, and a piezo constant of $3e\text{-}10$ m/Volt. A free state calculation of a 40 Volt excitation leads to a 12 nm change in the flying height of the slider 90.

As the preceding numerical simulations point out, relatively small voltages applied to the leads of the piezo layer 340, or piezo element 350, can alter the flying height significantly.

The specifics depend on the air bearing surface design of the slider 90 of FIGS. 1A-1D or 1F-1J, and to the relationships between the flying height and changes in the crown 92 and in the camber 94 curvatures.

The invention includes the voice coil actuator shown in FIG. 1E built with the flex circuitry 220 and the head gimbal assemblies 60-66 as shown in FIGS. 1A-1D or 1F-1J.

The invention also includes the hard disk drives 10 built with the voice coil actuators. The voice coil actuator includes an assembly of at least one actuator arm 50, and as shown, additional actuator arms 52, 54 and 56. A disk surface 12 is shown, which when the invention is in operation, rotates about spindle 80.

Figure 2:
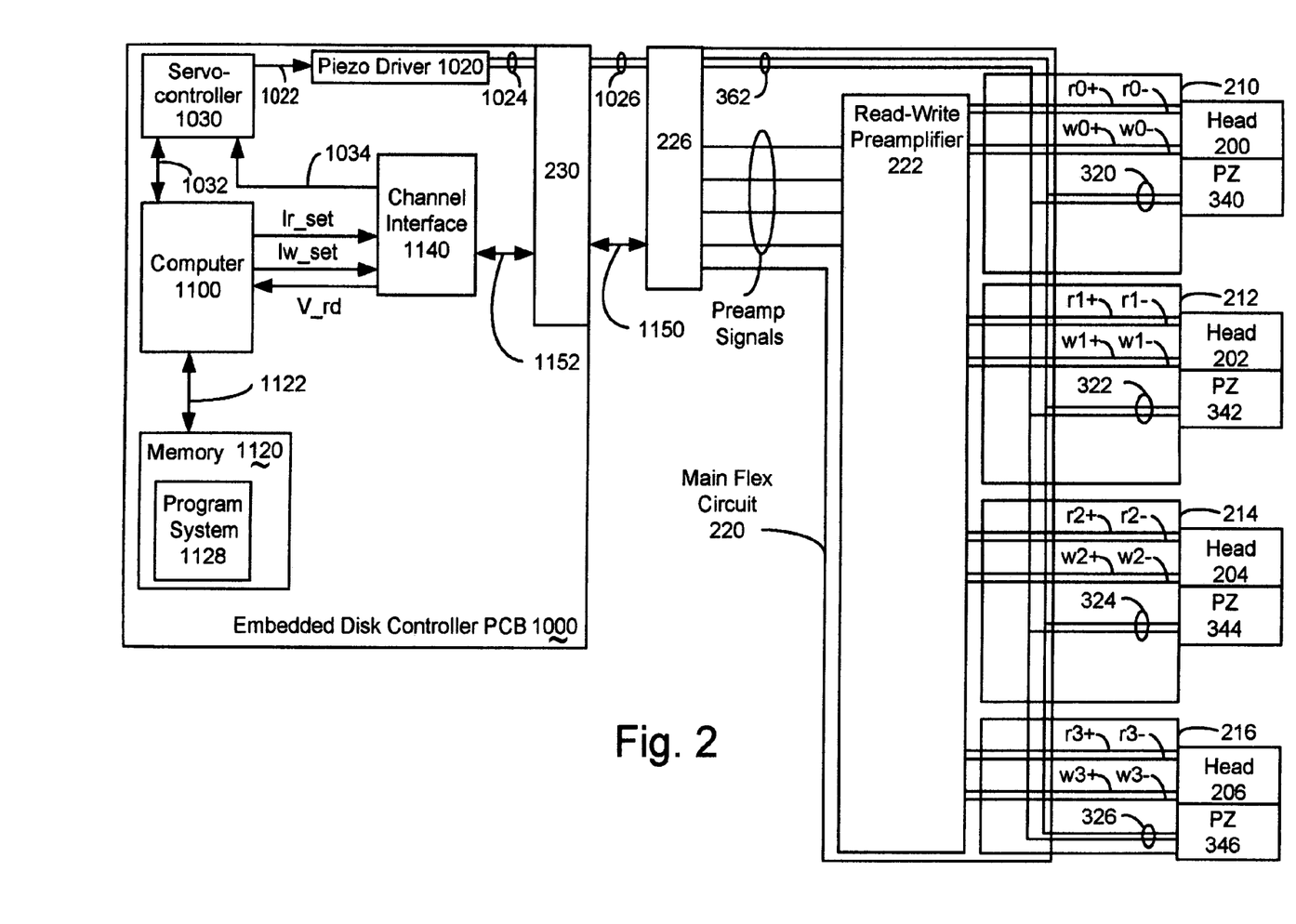
FIG. 2 shows the communication between the head gimbal assemblies as in FIGS. 1A-1D and the flex circuitry of FIG. 1E, sharing the piezo control bundle with all the piezo layers of multiple read-write heads.
Figure 3:
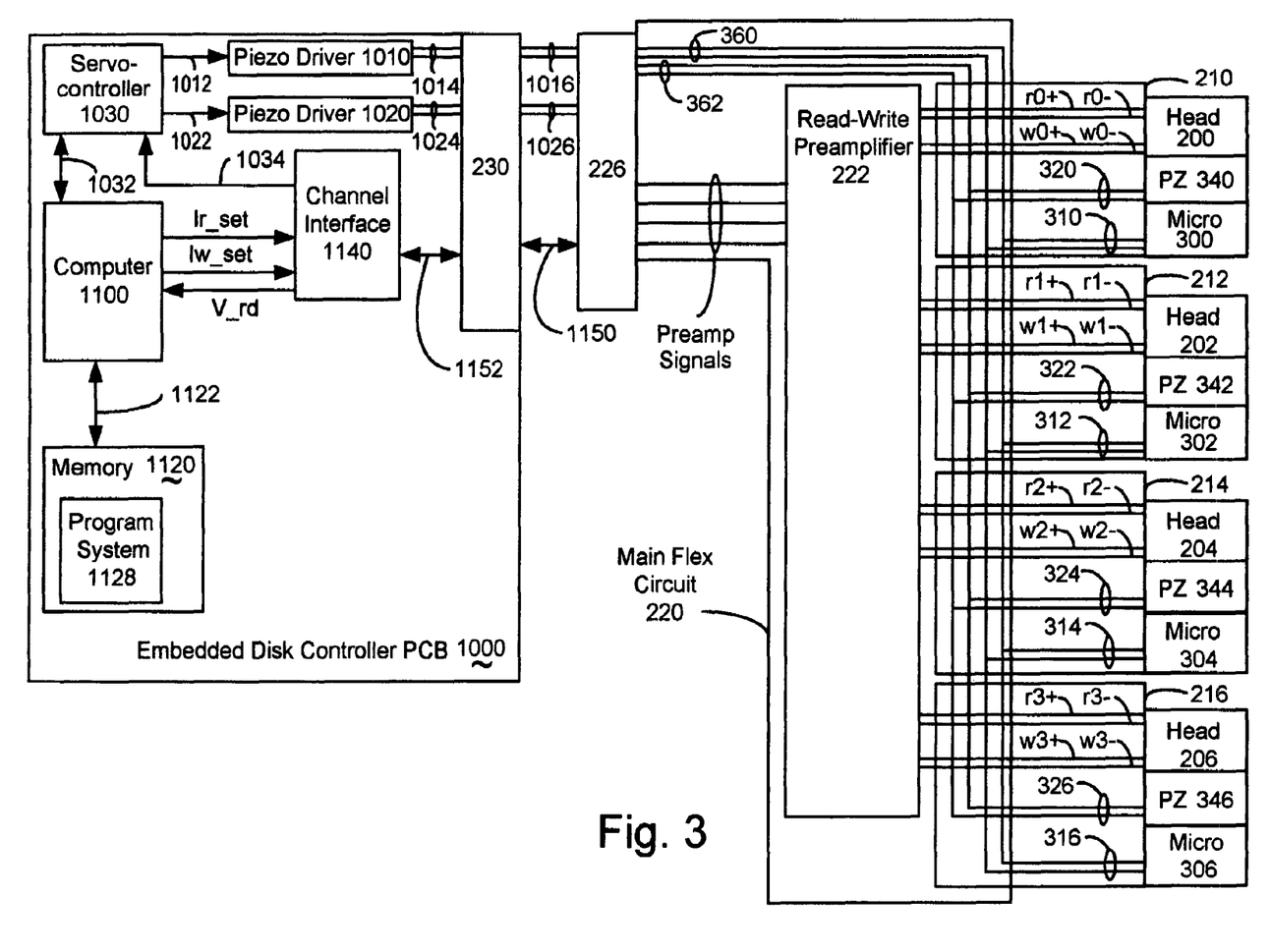
FIG. 3 shows the communication between the head gimbal assemblies of FIGS. 1A-1D, each further including a micro-actuator for positioning the read-write heads.
Figure 4:
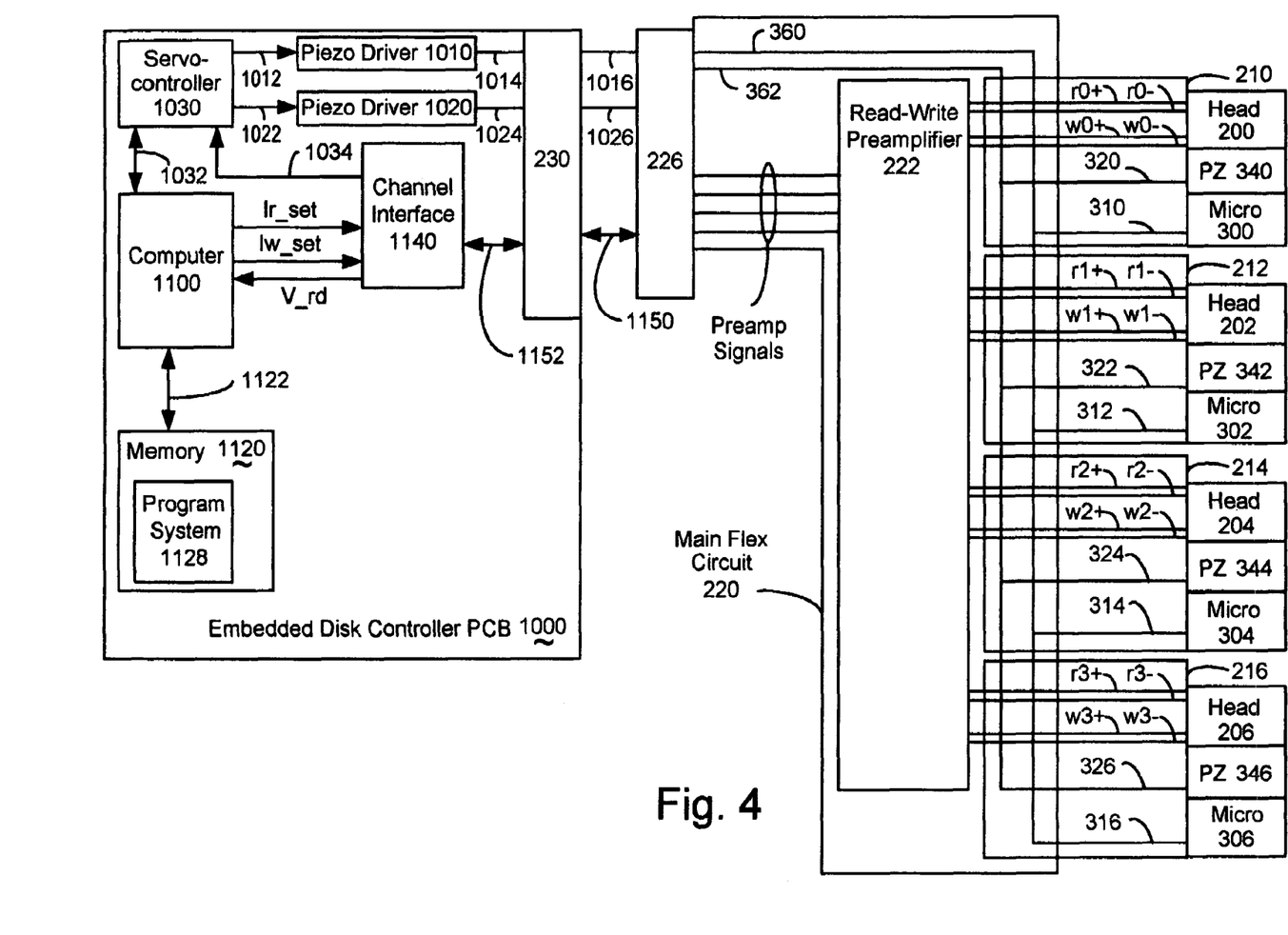
FIG. 4 shows a refinement of FIGS. 2 and 3, where the bundles each have one active wire.

In FIGS. 2-4, interconnects are shown to piezo layers 340-346 of FIGS. 1A-1D. However, the instances of piezo layers 340-347 are electrically equivalent to instances of the piezo elements 350 of FIGS. 1F-1J. While FIGS. 2-7D, and their discussions, focus on the piezo layers 340-346, this is done to simplify the discussion, and is not intended to limit the scope of the invention. Any combination of instances of the piezo layers 340 and piezo elements 350 may be used in the head gimbal assemblies 60-66 of the hard disk drive 10 of FIG. 1E. In the electrical discussion to follow, what is said regarding the piezo layers 340-346 is equally applicable to instances of the piezo element 350 of FIGS. 1F-LJ.

The preamplifier 222 of FIGS. 1E and 2-4, along with the coupling of the preamplifier to the differential read and write signals to the bridge flex circuits 210-216, is one of the main constraints for the main flex circuit 220. These constraints impact many of the components of the voice coil assembly as shown in FIG. 1E.

Figure 5:
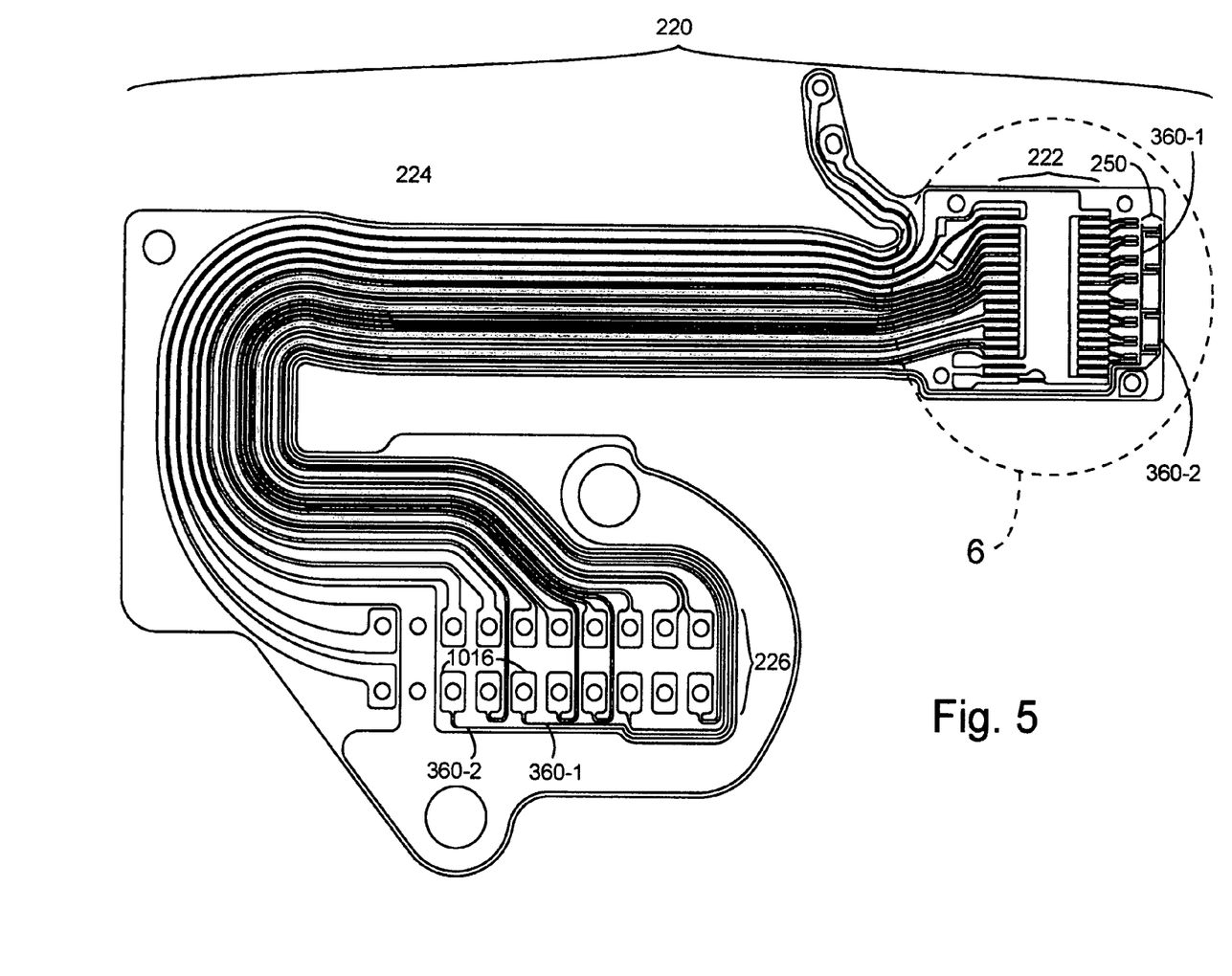
FIG. 5 shows a preferred embodiment of the main flex circuit of FIGS. 1E, 2, and 4.
Figure 6:
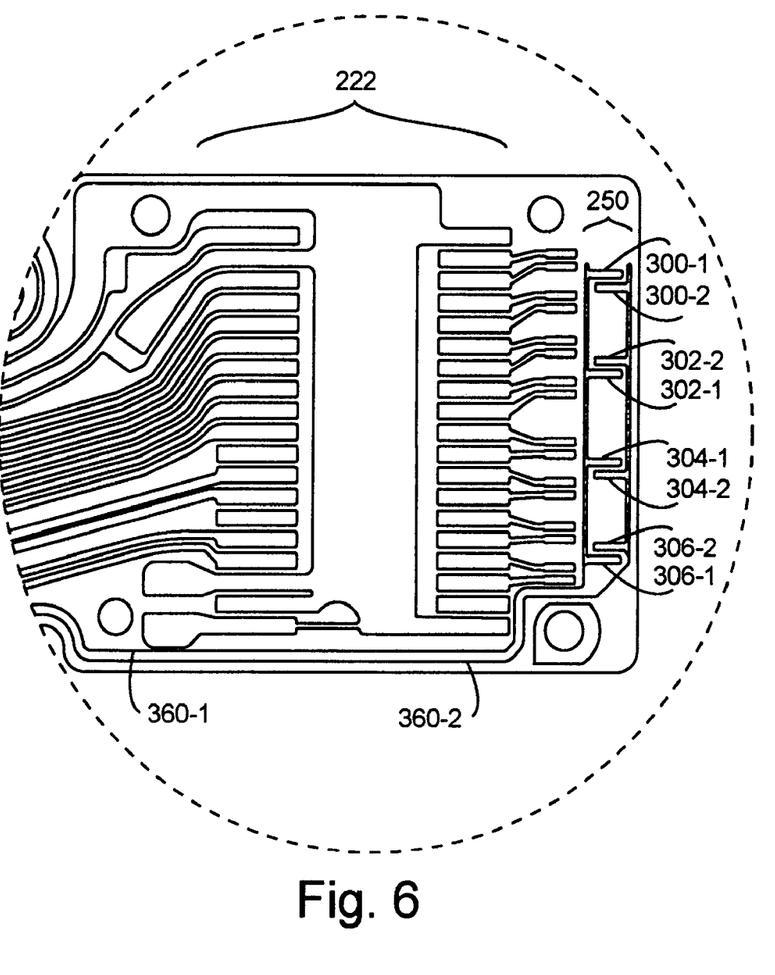
FIG. 6 shows an enlargement of the region of the main flex circuit of FIG. 5 housing the preamplifier and providing the coupling interface to the bridge flex circuits.

The main flex circuit 220 of FIGS. 1E and 2-5 includes a ribbon cable socket 226, providing preamplifier signals to a read-write preamplifier site 222. The ribbon cable socket 226 is coupled via flex region 224 to a preamplifier site 222 and a bridge coupling region 250, as shown in FIGS. 5 and 6. The ribbon cable socket 226 provides a piezo control bundle 362, which is shared with the piezo control bundles 320-326 of the bridge flex circuits 210-216.

The piezo control bundle 320 stimulates the leads of a piezo layer 340 to trigger the piezoelectric effect in FIGS. 3-5. Similarly, the micro-actuator control bundle 310 stimulates leads in the micro-actuator 300 to trigger the piezoelectric effect by the micro-actuator. When implementing a single wire approach, as in FIG. 5, the bundles have one wire. When using a two wire approach, as in FIGS. 3 and 4, the bundles have two wires.

While not shown, the piezo layers may employ a different approach than the micro-actuators.

The invention includes a communication mechanism shown in FIGS. 2-4, between the servo-controller 1030 and the piezo layers 340-346, which alter the flying height of their read-write heads 200-206. The communication mechanism includes a main flex circuit 220 receiving a control wire bundle 1024 via ribbon cable bundle 1026. The ribbon cable bundle 1026 is received at ribbon cable connector 226 to create the signal states on the piezo control bundle 362 in the main flex circuit 220. The piezo control bundle 362 is shared through the bridge flex circuits 210-216. The communication mechanism further includes the main flex circuit 220 coupled with at least two of the bridge flex circuits 210-216.

In FIGS. 2 and 3, the piezo control bundle 362 involves two wires carrying active signals.

In FIG. 4, the piezo control bundle 362 involves just one wire carrying an active signal. In FIG. 4, the second lead of the piezo layers 340-346 are tied to a shared ground.

Piezo layer 340 alters the flying height of the read-write head 200 in FIGS. 1A-1D, and 2-4. The bridge flex circuit 210 couples the piezo layer 340 and the read-write head 200 to the main flex circuit 220. This includes coupling the piezo control bundle 362 of the main flex circuit 220 to the piezo control bundle 320 for the piezo layer 340.

Similarly, bridge flex circuit 212 couples the piezo control bundle 362 to the piezo control bundle 322 for the piezo layer 342, in FIGS. 2-4. Bridge flex circuit 214 couples the piezo control bundle 362 to the piezo control bundle 324 for piezo layer 344. The bridge flex circuit 216 couples the piezo control bundle 362 to the piezo control bundle 326 for piezo layer 346.

In FIGS. 2-4, the servo-controller 1030 controls 1022 the piezo driver 1020, which drives wire bundle 1024, in the embedded disk controller printed circuit board 1000. The wire bundle 1024 connects to a ribbon cable connector 230. The ribbon cable connector 230 connects via a ribbon cable 1150 to a ribbon cable connector 226 of the main flex circuit 220. Ribbon cable 1150 includes a wire bundle 1026, which interconnects wire bundle 1024 with the piezo control bundle 362, in the main flex circuit 220.

When this aspect of the invention is in operation, and the disk drive is accessing a disk surface, all the piezo layers 340-346 perform the same action on their respective read-write heads. This insures proper flying height for the read-write head in the slider above the accessed disk surface. This also minimizes the consequences to the other voice coil actuator components, because of the sharing of the control bundle, the coupling region 250 of the main flex circuit 220 remains essentially the same shape and area.

Figures 7A, 7B, 7C, 7D:
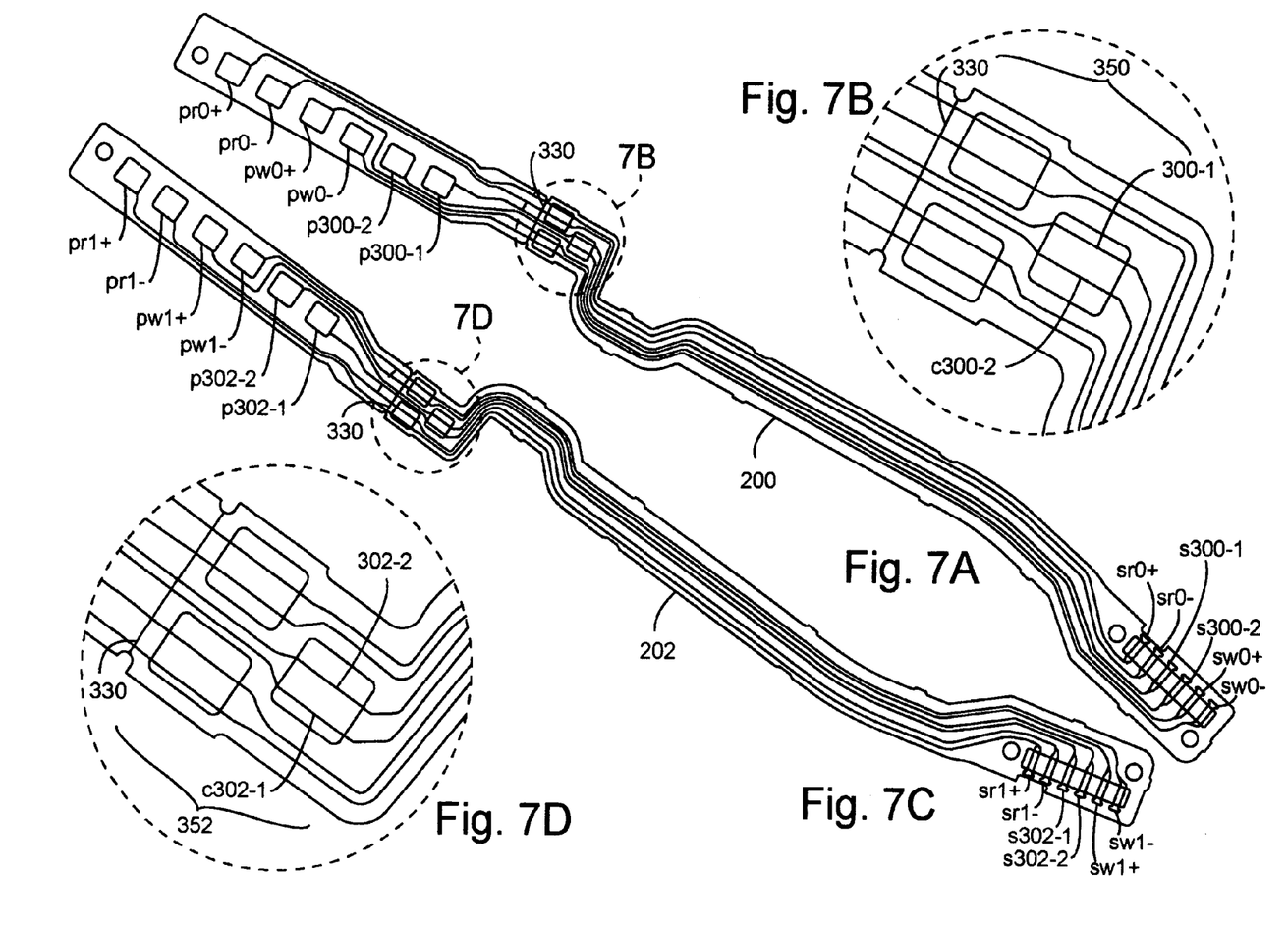
FIG. 7A shows a preferred bridge flex circuit providing a matching coupling interface to the main flex circuit of FIGS. 5 and 6.
FIG. 7B shows an enlargement of the matching coupling interface of FIG. 7A.
FIG. 7C shows a mirrored embodiment of the bridge flex circuit of FIG. 7A.
FIG. 7D shows an enlargement of the matching coupling interface of FIG. 7C.

The bridge flex circuit 310 of FIG. 7A also provides contacts for a slider containing the read-write head for the read differential signal pair, and the write differential signal pair, as sr0+, sr0−, sw0+, and sw0−. One skilled in the art will recognize that the exact order of these signal contacts will vary with different implementations, and any ordering is potentially preferred as the situation varies.

The bridge flex circuit 210 of FIG. 7A also provides contacts for the piezo control bundle to the micro-actuator as control signal s300-1 and control signal s300-2. In embodiments using a one wire approach, the piezo control bundle would have one wire, with only one contact.

FIG. 7B shows an enlargement of the coupling site 350 of the bridge flex circuit 210 of FIGS. 1, 3, and 7A for the piezo control bundle contacts c300-1 and c300-2.

FIG. 7C is the mirror image of FIG. 7A, and shows the bridge flex circuit 212. The mirror bridge flex circuit is required for a second head gimbal assembly either accessing the other disk surface of a disk, or the other head gimbal assembly mounted on the same actuator arm 50. FIG. 7D is the enlargement of the coupling site 352 of the bridge flex circuit 212, which mirrors FIG. 7B. The probe points pr1+, pr1−, pw1+, pw1−, p302-2, and p302-1 are similar to the corresponding probe points of FIG. 7A. The coupling site 352 is similar, mirroring coupling site 350 of FIGS. 7A and 7B. The slider contacts sr1+, sr1−, wr1+ and wr1− are similar to those of FIG. 7A. The control signal bundle s302-1 and s302-2 are similar to those of FIG. 7A.

FIGS. 7A and 7B show a cleavage line 330, which is the approximate place where the test strip is removed from the bridge flex circuit. FIGS. 7C and 7D show the cleavage line 330, which serves the same purpose.

The invention includes the flex circuit assembly of the main flex circuit 220 coupling with at least two of the bridge flex circuits 210-216, as in FIGS. 2-4. The making of the flex circuit assembly includes the following steps. Each of the bridge flex circuits 210 and 212, with its test strip, is probed to confirm the connectivity of the bridge flex circuit. The test strip is removed to create the bridge flex circuit 210 by cutting at the cleavage line 330. Each of the bridge flex circuits, 210-216, are positioned with their respective bridge coupling site 350, 352 aligned with the bridge coupling region 250 of the main flex circuit 220. The aligned assembly of the main flex circuit and the bridge flex circuits are reflow soldered to create the shared coupling of the piezo control bundle 362.

The other components of the main flex circuit 220 include a preamplifier 222 and a ribbon cable socket 226, as well as passive components, which may include capacitors and resistors.

These other components of the main flex circuit 220 may be soldered to the main flex circuit 220 before, during, or after, the bridge flex circuits 210-216.

Making the voice coil actuator of FIG. 1E includes the following steps. The flex circuit assembly of FIGS. 2-4, is assembled with the head gimbal assemblies 60-66 and the actuator arms 50-56. The head gimbal assemblies 60-66 include the piezo bi-mophs 340-346, which are electrically coupled with the respective leads s300-1 and s300-2 of the bridge flex circuits 210-216. This coupling shares the piezo control bundle 362 of the main flex circuit 220 with the piezoelectric control bundles 320-326 of the bridge flex circuits 210-216.

The voice coil actuator, ribbon cable 1150, and embedded disk controller printed circuit board 1000 of FIGS. 2-4, are used to assemble the hard disk drive 10. The hard disk drive 10 is made by coupling the ribbon cable 1150 between ribbon cable site 226 and ribbon cable site 230. Ribbon cable site 226 is on the main flex circuit 220. Ribbon cable site 230 is on the embedded disk controller printed circuit board 1000. Ribbon cable 1150 includes a coupling 1026 between a control signal bundle 1024 generated by the piezo driver 1020 and the shared piezo control bundle 362 of the main flex circuit 220. The piezo driver 1020 is controlled by the servo-controller 1030, which receives feedback 1034 from the channel interface 1140.

The piezo driver 1020 of FIGS. 2-4 often includes a Digital to Analog Converter (DAC) providing an initial analog signal, which is often amplified and filtered to generate the states of the control signal bundle 1024. The servo-controller 1030 may control 1012 the piezo driver 1010 by controlling the output of the DAC, the amplification gain, and/or the filter parameters. Alternatively, the filtering may be a fixed network preferably containing a combination of resistors, capacitors, and possibly inductors. The amplification may be from a preset amplifier or fixed function driver circuit, or from a programmable gain amplifier.

The feedback 1034 of FIGS. 2-4 often includes a Position Error Signal measured and/or estimated at least partly by the channel interface 1140. The channel interface 1140 uses the preamplifier signals of the read-write preamplifier 222, which are part of the couplings provided by ribbon cable 1150. The control of the read-write preamplifier 222 is determined at least in part by the setting of a read bias current Ir_set and a write bias current Iw_set. The determined read channel voltage V_rd of the selected read differential signal pair, generated by the read-write head over the accessed track on the rotating disk surface, is provided by the channel interface 1140. These controls are made, and the read channel voltage is received, by a computer 1100. The computer 1100 accesses 1122 a program system 1128, residing in a memory 1120 to implement the overall operation of the disk drive 10. The computer 1100 further directs 1032 the servo-controller 1030 in its real-time operations, which may entail operational, initialization and/or calibration activities.

The invention also applies to hard disk drives 10 with at least two disk surfaces supplied with micro-actuators 300-306 to aid in positioning the read-write heads 200-206, as in FIGS. 3 and 4. The micro-actuators are located near the read-write heads of the head gimbal assemblies 60-66. The ribbon cable socket 226 of FIGS. 3-4, also provides a source control bundle 360, shared with the control wire bundles 310-316 of the bridge flex circuits 210-216.

The invention further includes a communication mechanism shown in FIGS. 3-4, between the servo-controller 1030 and the micro-actuators 300-306, which position the multiple read-write heads 200-206. The communication mechanism includes a main flex circuit 220 receiving a control wire bundle 1014 via ribbon cable bundle 1016. The ribbon cable bundle 1016 is received at ribbon cable connector 226 to create the signal states on the source control bundle 360 in the main flex circuit 220. The source control bundle 360 is shared with the micro-actuator control bundles 310-316 through the bridge flex circuits 210-216.

In FIG. 3, the source control bundle 360 uses two wires carrying active signals. In FIG. 4, the source control bundle 360 uses just one wire carrying an active signal. In FIG. 4, the second leads of the micro-actuators 300-306 are tied to a shared ground.

Micro-actuator 300 positions the read-write head 200 in FIGS. 3 and 4. The bridge flex circuit 210 couples the micro-actuator 300 and the read-write head 200 to the main flex circuit 220. This includes coupling the source control bundle 360 of the main flex circuit 220 to the micro-actuator control bundle 310 for the micro-actuator 300.

Similarly, bridge flex circuit 212 couples the source control bundle 360 to the micro-actuator control bundle 312 for the micro-actuator 302, in FIGS. 3 and 4. Bridge flex circuit 214 couples the source control bundle 360 to the micro-actuator control bundle 314 for the micro-actuator 304. The bridge flex circuit 216 couples the source control bundle 360 to the micro-actuator control bundle 316 for the micro-actuator 306.

In FIGS. 3 and 4, the servo-controller 1030 controls 1012 the piezo driver 1010, which drives wire bundle 1014, in the embedded disk controller printed circuit board 1000. The wire bundle 1014 connects to a ribbon cable connector 230. The ribbon cable connector 230 connects via a ribbon cable 1150 to a ribbon cable connector 226 of the main flex circuit 220. Ribbon cable 1150 includes a wire bundle 1016, which interconnects wire bundle 1014 with the source control bundle 360, in the main flex circuit 220.

The internal structure of the piezo-driver 1010 is similar to the piezo-driver 1020, described above.

The micro-actuators 300-306 may be non co-located with their respective read-write heads 200-206 of FIGS. 3 and 4. However, it is currently preferred that they be co-located, as this tends to reduce the voltage requirements for the piezo driver 1010.

When these aspects of the invention are in operation, and the disk drive is accessing a disk surface, all the micro-actuators 300-306 perform the same positioning action on their respective read-write heads, while the piezo layers control the flying height. This insures proper positioning of the read-write head in the slider above the accessed disk surface. This also minimizes the consequences to the other voice coil actuator components, because of the sharing of the control bundle 360, the coupling region 250 of the main flex circuit 220 remains essentially the same shape and area.

The invention offers the advantages of using micro-actuators for each surface of a multiple surface, hard disk drive. By not disrupting the overall design of the voice coil actuator, the invention promotes cost efficiencies. The invention further promotes reliability by allowing the use of voice coil actuator components already in production. Using the micro-actuators increases the servo bandwidth from about 1.1 K Hz to over 2.6 K Hz.

FIG. 7A also shows a bridge flex circuit 320 with a test strip providing a probe point for the piezo control bundle and the micro-actuator control bundle, when both use the single wire approach.

The test strip probe points of FIG. 7A for the piezo control bundle 320, and micro-actuator control bundle 310, include the signals 300-1 and 300-2, which are labeled p300-1 and p300-2, respectively. Similarly, the FIGS. 7B-7C show the preferred use of the single wire approach for providing shared controls for piezo layers and micro-actuators.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A head gimbal assembly for a head disk drive, comprising:
   a piezo element mechanically coupled by a flexure to a slider top near a read-write head;
   wherein said piezo element includes two leads;
   wherein said piezo element mechanically coupled to said slider is further comprised of:
   said piezo element bending said flexure to alter a flying height of said read-write head to a rotating disk surface when said leads experience a voltage difference;
   wherein said read-write head accesses said rotating disk surface; and
   wherein said peizo element bending said flexure is comprised of at least one member of the collection consisting of:
   said piezo element bending said flexure to alter a pitch of said slider with said rotating disk surface; and
   said piezo element bending said flexure to alter a camber of said slider;
   wherein said flying height of said slider is altered based upon altering at least one member of the collection consisting of: said camber of said slider and said pitch of said slider to said rotating disk surface.

2. The apparatus of claim 1, wherein a first of said leads is tied to a ground.

3. The apparatus of claim 1, further comprising a micro-actuator mechanically coupled said slider.

4. The apparatus of claim 3, wherein said micro-actuator is co-located with said slider.

5. A voice coil actuator, comprising: at least one of said head gimbal assemblies of claim 1.

6. The apparatus of claim 5, further comprising at least two of said head gimbal assemblies.

7. The apparatus of claim 6, further comprising a piezo control bundle provided to each of said piezo element.

8. A hard disk drive, comprising said voice coil actuator of claim 5.

9. A method of making a hard disk drive using said voice coil actuator of claim 5, comprising the step of:
   coupling said voice coil actuator via a ribbon cable to an embedded disk controller printed circuit board; wherein said embedded disk controller printed circuit board includes a piezo driver for driving said piezo control bundle via said ribbon cable;
   wherein said disk drive includes said voice coil actuator coupled via said ribbon cable to said embedded disk controller printed circuit board.

10. The hard disk drive as a product of the process of claim 9.

11. A head gimbal assembly for a head disk drive, comprising:
   a piezo element mechanically coupled by a flexure to a slider top near a read-write head; and
   a micro-actuator mechanically coupled said slider; wherein said micro-actuator is non co-located with said slider;
   wherein said piezo element includes two leads;
   wherein said piezo element mechanically coupled to said slider is further comprised of:
   said piezo element bending said flexure to alter a flying height of said read-write head to a rotating disk surface when said leads experience a voltage difference; and
   wherein said read-write head accesses said rotating disk surface;
   wherein said peizo element bending said flexure comprises at least one member selected from the group consisting of: said piezo element bending said flexure to alter a pitch of said slider with said rotating disk surface; and said piezo element bending said flexure to alter a camber of said slider;
   wherein said flying height of said slider is altered based upon altering at least one member selected from the group consisting of: said camber of said slider and said pitch of said slider to said rotating disk surface.

12. The apparatus of claim 11, wherein a first of said leads is tied to a ground.

13. A voice coil actuator, comprising: at least one of said head gimbal assemblies of claim 11.

14. The apparatus of claim 13, further comprising at least two of said head gimbal assemblies.

15. The apparatus of claim 14, further comprising a piezo control bundle provided to each of said piezo element.

16. A hard disk drive, comprising said voice coil actuator of claim 13.

* * * * *